United States Patent
Maclean et al.

(10) Patent No.: US 10,573,856 B2
(45) Date of Patent: Feb. 25, 2020

(54) BARRIER LAYER COATINGS FOR BATTERY POUCH CELL SEAL

(71) Applicant: GM Global Technology Operations LLC, Detroit, MI (US)

(72) Inventors: Gregory K. Maclean, Warren, MI (US); Gayatri Vyas Dadheech, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 656 days.

(21) Appl. No.: 14/711,966

(22) Filed: May 14, 2015

(65) Prior Publication Data

US 2016/0336552 A1 Nov. 17, 2016

(51) Int. Cl.
*H01M 2/08* (2006.01)
*H01M 2/02* (2006.01)

(52) U.S. Cl.
CPC .......... *H01M 2/08* (2013.01); *H01M 2/0262* (2013.01); *H01M 2/0267* (2013.01); *H01M 2/0277* (2013.01); *H01M 2/0285* (2013.01); *H01M 2/0287* (2013.01); *H01M 2/02* (2013.01); *H01M 2/021* (2013.01); *H01M 2/0212* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 7,285,334 B1* | 10/2007 | Yamashita | .......... | H01M 2/0267 428/220 |
| 2005/0202646 A1* | 9/2005 | Burrows | ............... | H01L 23/562 438/396 |
| 2011/0311862 A1* | 12/2011 | Ahn | ...................... | H01M 2/021 429/179 |
| 2012/0121944 A1* | 5/2012 | Yamamoto | ........ | B29C 45/14065 429/7 |
| 2012/0148888 A1* | 6/2012 | Yun | ...................... | H01M 2/021 429/82 |

* cited by examiner

*Primary Examiner* — Milton I Cano
*Assistant Examiner* — Haixia Zhang
(74) *Attorney, Agent, or Firm* — Quinn IP Law

(57) ABSTRACT

A prismatic battery cell and a method of making such a cell. The cell includes one or more anode regions, cathode regions, and electrolyte regions to facilitate ion flow between the anode and cathode regions. Electrically-conductive tabs are attached to the corresponding anode and cathode regions, and a pouch-like containment is formed around the regions. The containment includes facing substantially planar surfaces sealingly joined to one another. A barrier layer coating includes at least one low-permeability material and is placed over at least a portion of the cell edge defined by the joined surfaces such that the barrier layer coating blocks ambient gases or vapors from passing through the heat seal region that is used to join the pouch surfaces. The barrier layer coating may also include one or more hydrophobic surface treatments or enhancements, including an additional layer of surface treatments or, in another form, by surface roughening.

21 Claims, 6 Drawing Sheets

$$0 = \gamma_{SG} - \gamma_{SL} - \gamma_{LG} \cos \theta_C$$

BARRIER LAYER COATINGS FOR BATTERY POUCH CELL SEAL

BACKGROUND OF THE INVENTION

This invention relates generally to a way to improve the sealing of prismatic-shaped battery cells, and more particularly to the use of barrier layers made from extremely hydrophobic materials along the borders or edges of stacked planar battery cells as a way to improve corrosion resistance and reduced vapor permeability through the regions where adjacent cells are joined.

Lithium-based batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells. One common vehicular form of the battery pack is known as a power battery, while another is known as an energy battery.

In the power battery pack variant, the individual cells that make up a battery pack are configured as prismatic (i.e., rectangular) cans that define a rigid outer housing known as a cell case. In the energy battery pack variant, the individual cells are housed in a thinner, flexible prismatic pouch. In situations where the pouch forms a containment structure for the electrically active internal components, the present inventors have joined the outer periphery of adjacently-facing planar pouch surfaces together with adhesive-based heat seals. The present inventors have determined that such heat seals (which may be made up of one or more layers of polypropylene, nylon, polyethylene and adhesive) do not provide protection against edgewise inward oxygen and water vapor permeation or edgewise outward electrolyte solvent vapor escape, and that either such phenomena can—if left unchecked—lead to premature cell failure or performance degradation. Attempts to provide additional features to reduce susceptibility to such leakage are unavailing, as they are complex and expensive.

SUMMARY OF THE INVENTION

In accordance with one aspect of the present invention, a prismatic battery cell comprising: at least one anode region, at least one cathode region and an electrolyte region to facilitate ion flow between the regions, a containment that acts as a housing or shell formed around the anode, cathode and electrolyte regions; a plurality of electrically-conductive tabs tending outward from the stack along at least one edge formed in the containment/housing/shell; and a hydrophobic barrier formed along a substantial entirety of the edge. The barrier defines at least one "low permeability" property. In one preferred form, the containment is configured as a relatively flexible metal pouch, while in another it is configured as a rigid plastic can. When configured as a pouch, the surfaces that make up the pouch are preferably aluminum-based, and are relatively thin (for example, on the order of about 40 microns in thickness).

In the present disclosure, the term "battery" and its variants is understood to include individual battery cells (such as the prismatic-shaped cells mentioned above), as well as larger assemblies (such as modules, packs or the like) that are made up of such cells, and that reference to each as individual components or combinations involving such components will be apparent from the context. Likewise, while the term "battery pack" is used herein to discuss a substantially complete battery assembly for use in propulsive power and other high-power applications, it will be understood by those skilled in the art that related terms—such as "battery unit" or the like—may also be used to describe such an assembly, and that either term may be used interchangeably without a loss in such understanding. With regard to the individual battery cells, their prismatic construction facilitates their stacking or alignment within an enclosure such that upon placement of the stacked battery cells in the volume defined by the enclosure, a relative simple, straightforward conductive member that is formed in or on the enclosure cover can be securely connected to the busbar or current pathway such that current generated within the cells is delivered to the load.

In the present context, the battery pack is considered to be a substantially complete assembly or system of components necessary for propulsion of the vehicle for which the pack was designed, while battery modules and individual battery cells are (as mentioned above) considered to be subcomponents of the overall system. Likewise, an assembly of components for a battery pack used for vehicular applications may include—in addition to numerous battery cells—cooling plates, frames, trays, securing mechanisms and other equipment that, while not contributing to the production of electric power, form an important part of the overall battery system nonetheless.

In a preferred form, Li-ion or Li—S batteries are used, the latter due in part to its higher energy density relative to the former (roughly 500 W*h/kg versus roughly 150 to 200 W*h/kg) as the host sulfur atom is able to accept two lithium ions as compared to the host atom of a Li-ion battery only being able to accept fewer than one lithium ion.

According to yet another aspect of the invention, a prismatic battery cell includes the anode, cathode and electrolyte regions as discussed above, as well as the tabs and pouch-like containment with surfaces joined by a heat seal. The seal area used for containment surface joining is substantially isolated from the ambient environment by a barrier layer coating with a substantially planar major surface formed to face a direction that is substantially orthogonal to a substantially planar major surface formed by the heat seal. Some additional measure of treatment is formed on the barrier layer coating to enhance its hydrophobic properties; one such measure includes an additional layer of hydrophobic material, while another includes enhanced surface roughness.

According to yet another aspect of the invention, a method of making a prismatic battery cell with reduced edgewise diffusion is disclosed. The method includes arranging a battery cell to have the aforementioned anode region, cathode region and electrolyte region, all surrounded by a containment made up of a pair of facing substantially planar surfaces cooperatively joined to one another along respective substantially peripheral seal areas. In addition, tabs are made to project out of one or more edges of the containment such that they may be connected to a suitable load for the current being generated within the anode, cathode and electrolyte regions. A low permeability barrier layer coating is deposited over the seal area along at least a portion of an edge defined by the joined surfaces. As before, additional treatment or layers may be used in conjunction with the barrier layer coating to enhance its hydrophobic behavior.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
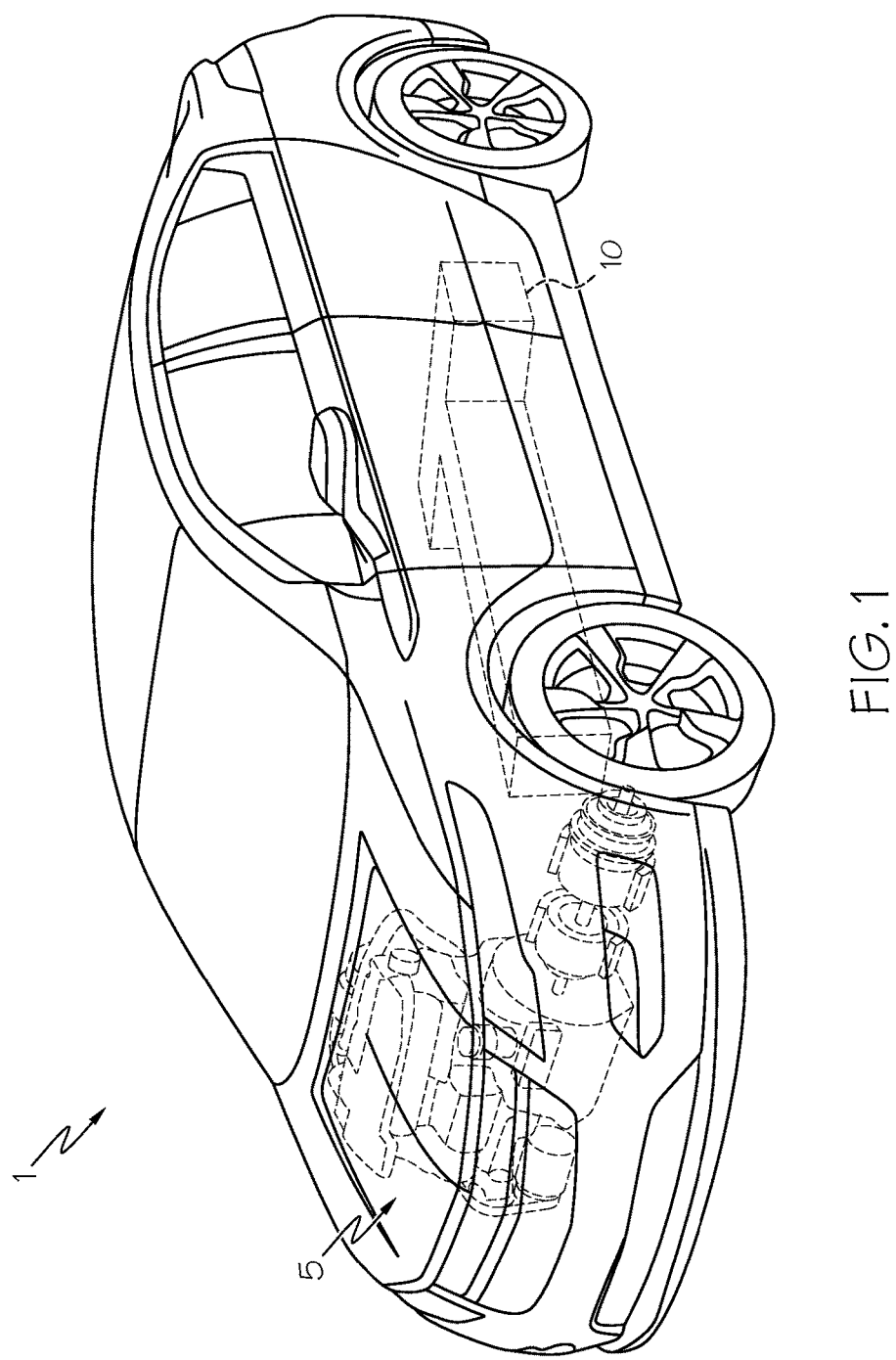
FIG. 1 shows a vehicle with a hybrid propulsion system in the form of a battery pack and an internal combustion engine.

Referring first to FIG. 1, a vehicle 1 that can be used in conjunction with the present invention is shown. Vehicle 1 includes a hybrid propulsion system in the form of an electric power source made up of a conventional ICE 5 and a notional battery pack 10, both cooperative with one or more electric motors and transmission (for example, in the form of a planetary gear set) that makes up a drivetrain 15. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. As discussed elsewhere in the present disclosure, battery pack 10 may either be in the power battery pack or energy battery pack form, the particular variant becoming apparent from the context. Additional drivetrain components (none of which are shown) useful in providing propulsive power to one or more of the wheels and coupled to one or both of the battery pack 10 and ICE 5 are understood to include rotating shafts, axles, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

Figure 2:
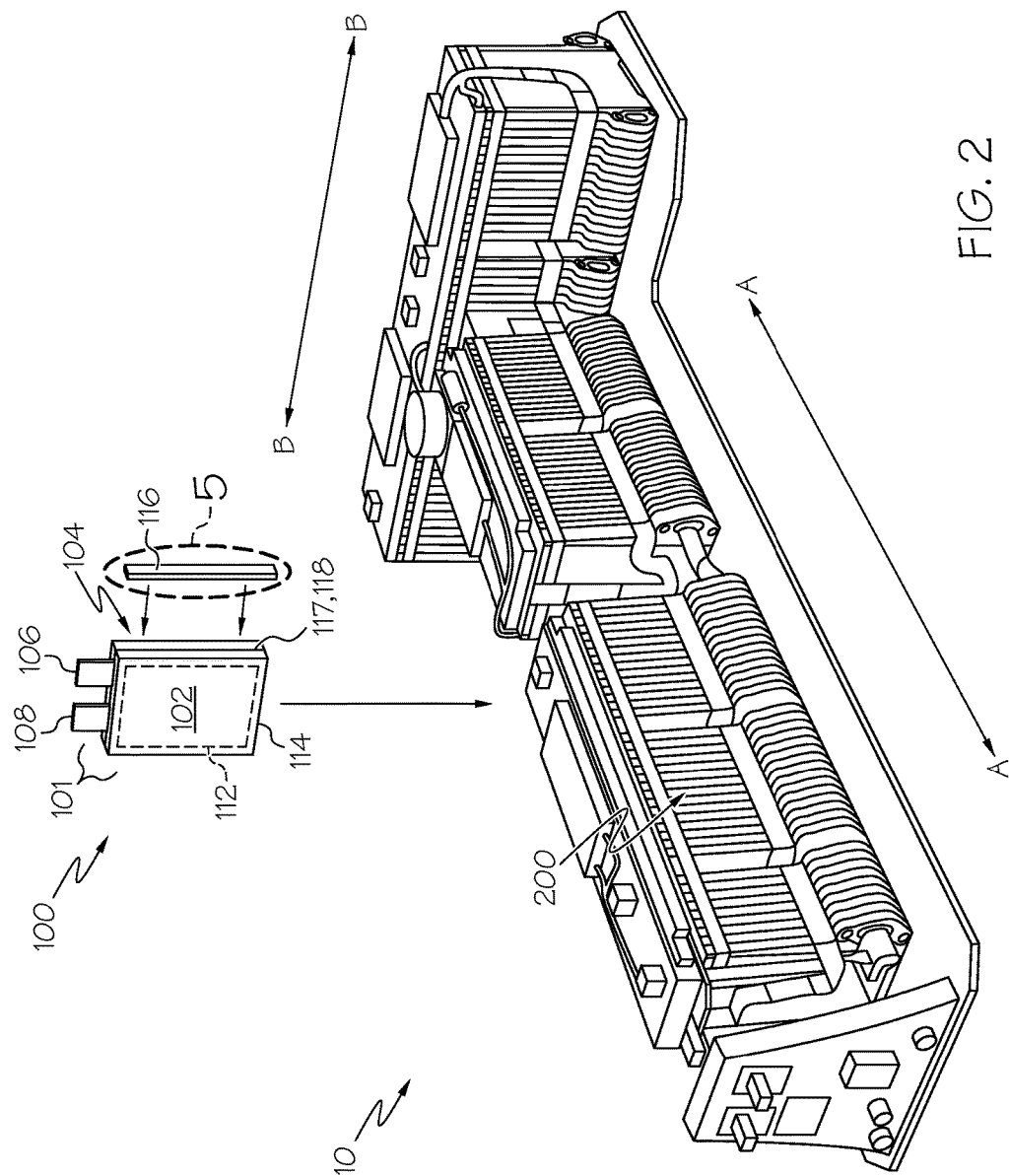
FIG. 2 shows details associated with an individual prismatic pouch battery cell, as well as its placement within a notional energy battery pack.
Figure 3:
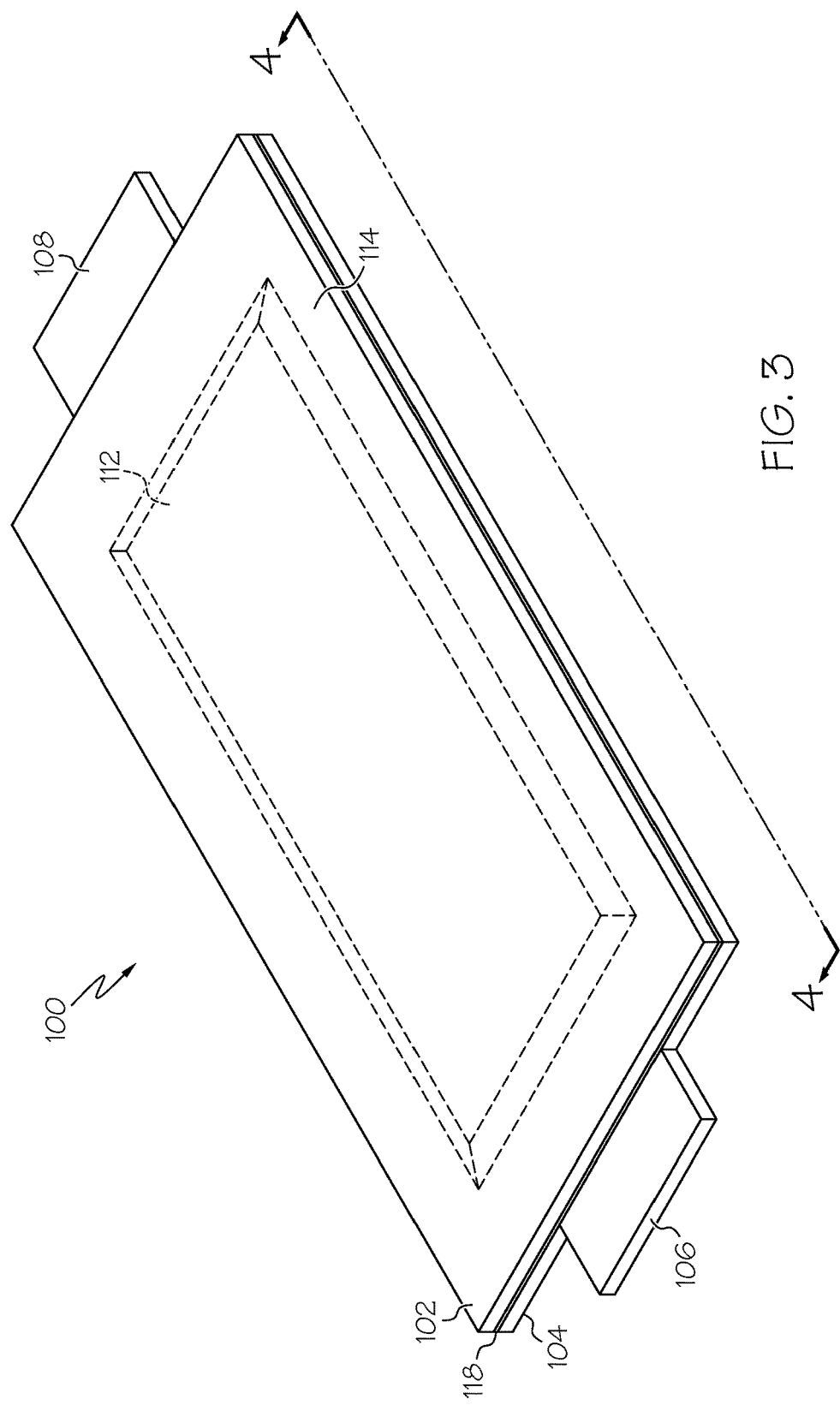
FIG. 3 shows a perspective view of an alternate prismatic pouch configuration of the battery cell.

Referring next to FIGS. 2 and 3, battery pack 10 is the electric current source for vehicle 1, and is in the form of numerous prismatic pouch lithium-ion battery cells 100 that are aligned in a facing arrangement (much like a deck of cards) along stacking direction, dimension or axes A-A and B-B. A group of numerous individual cells 100 may be grouped within larger units called modules 200 that are in turn placed with an enclosure to define the battery pack 10. It will be appreciated by those skilled in the art that the dual nature of the stacking axes depicted are unique to the T-shaped nature of the battery pack 10 and that in variants (not shown) where all of the battery cells 100 are aligned along a single common axis (such as axis A-A), reference to such additional stacking axes is not required. In any event, any battery cell 100 stacking alignment as discussed herein will be apparent from the context. As with the additional drivetrain components discussed above, other equipment for integration of the battery pack 10 into vehicle 1 may include (among others) a battery system monitor (BSM) unit and a manual service disconnect (MSD) unit, as well as a battery disconnect unit (BDU) and ancillary structure for electrical control, structural support, cooling, electrical connectivity (via busbars and cables, for example) or the like. In the energy battery form shown, the individual cells 100 that make up battery pack 10 are configured as rectangular (i.e., prismatic) pouches 101 with joined generally planar surfaces 102, 104. Positive and negative terminals in the form of projecting tabs 106, 108 may be situated on one edge 110 (shown presently as the top edge in FIG. 2) of the pouch 101 exterior to act as electrical contacts for connection (via busbar, for example) to an outside load or circuit. In another form, the tabs 106, 108 may extend from opposing edges of the pouch-shaped containment (such as shown in FIG. 3); it will be appreciated by those skilled in the art that the choice of tab 106, 108 location is dictated by the space available within the automotive environment, as well as preferred placement of the current-collecting busbars or related power cabling, and that either variant is within the scope of the present invention. Furthermore, in the present context, the edge is that region of the pouch 101 that is defined by and around a seam 117 where the adhesive or related joining of the opposing surfaces 102, 104 takes place. It will be appreciated by those skilled in the art that in the case of a prismatic battery cell 100, such joining will define four edges, and that to minimize diffusion and related gas permeability, a substantial entirety of all four edges will need to be treated in the manner disclosed herein, keeping in mind that the regions immediately adjacent the projecting tabs 106, 108 may not have as much barrier layer coating continuity as where no such projections are present. As will be discussed in more detail below, seam 117 is the location between the joined opposing surfaces 102, 104, and is part of a heat seal edge 118 (that in turn is part of a peripherally-mounted heat seal 114 that is discussed in more detail below in conjunction with FIGS. 4 and 5) and an overlaying barrier layer coating 116 along the edge are situated. Moreover, because some of the dimensions of the coatings, layers, seals and related structures discussed herein are very small (for example, in the micrometer range), the attributes depicted in the present figures are not to scale in order to facilitate a better visualization of the inventive concept. Thus, although barrier layer coating 116 is shown as occupying a significant amount of the thickness of cell 100 or one of its joined opposing surfaces 102, 104, its actual dimension is significantly narrower, occupying only as much width as needed in order to cover the heat seal edge 118 that is formed at seam 117.

Both of the cell 100 variants depicted in FIGS. 2 and 3 define a stack type of internal electrode structure that is encased within flexible pouch 101 that in one form has its surfaces 102, 104 made of an aluminum foil with a protective polymer coating; within the pouch 101, a number of sheet-shaped negative carbon-based electrodes (anodes, not shown) are connected to one of the tabs 106 and a number of sheet-shaped positive manganese-based storage electrodes (cathodes, not shown) are connected to the other of the tabs 108; these electrodes are stacked with an electrolyte that provides a porous medium for the transfer of the electrical charge ions from the storage anode to be chemically bound at the cathode, while also acting as an insulator or separator between each of the electrodes. As is understood in the art, the battery cell 100 may be recharged by using electric current to forcibly separate the lithium ions from the cathode and send them through the electrolyte and back to the anode. Within the present context, the stacked anode, cathode and electrolyte form an active region (also referred to as the cell electrode stack, generally shown as 112) where electric current is generated, and are contained completely within the joined aluminum foil surfaces 102, 104.

Although the cell 100 used in the energy battery variant is of generally planar construction, in actuality the cell 100 may assume an edgewise trapezoidal profile where the portion of the pouch 101 around the active region 112 is relatively thick along the appropriate stacking axis A-A (as shown with particularity in FIG. 2) compared to the periphery that overlies a heat seal 114 that is present in the area adjacent where the foil of surfaces 102, 104 are joined together. It will be appreciated by those skilled in the art that a battery made according to the present invention is not limited to the embodiments and examples depicted herein, and that various changes and modifications are possible without departing from the scope of the invention. It will also be appreciated by those skilled in the art that numerous individual alternating positive and negative electrodes may be grouped within each active region 112 and spaced apart from one another along the stacking direction to be kept electrically isolated by non-conductive separators (not shown). Leads from each of the negative electrodes are gathered together inside the pouch 101 of cell 100 to feed the tab 108, while leads from each of the positive electrodes are likewise gathered together to feed the tab 106. As can be seen with particularity in FIG. 3, the perimeter area defined by the heat seal 114 extends beyond the active region 112 of each cell 100; in this way, when a portion of the peripheral heat seal 114 is folded over and crimped (not shown) as part of the pouch 101 assembly process, the portion of the heat seal edge 118 may also bound up in the crimping.

Figure 4:
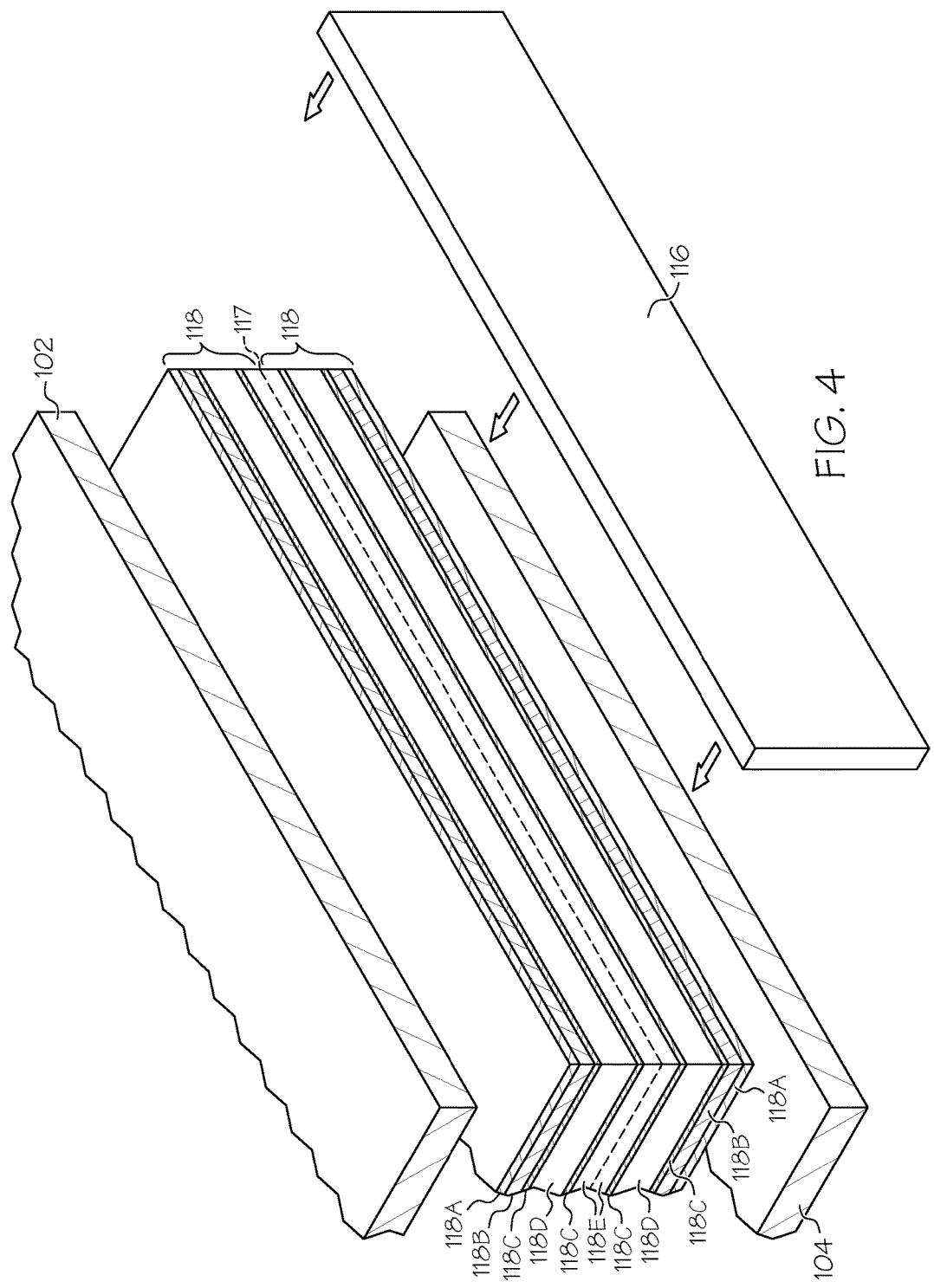
FIG. 4 shows a notional heat seal formed between two adjacently-joined containment pouch surfaces of the cells of FIGS. 2 and 3, as well as the placement of a single layer barrier layer coating according to one embodiment of the present invention.

Referring next to FIG. 4, an edgewise view of a multilayer version of the heat seal edge 118 that is formed at the perimeter of the pouch 101 of FIGS. 2 and 3 is shown, as is placement of a simplified version of the barrier layer coating 116 thereover. Although shown for viewing simplicity as covering only the heat seal edge 118 in the figure, the barrier layer coating 116 also may be made large enough to also overlay both sides of the perimeter area defined by the heat seal 114. Significantly, the barrier layer coating 116 acts as an electrical insulator between the heat seal edge 118 and other conductive surfaces within the battery pack of FIG. 2, as well as provides added corrosion resistance to the heat seal edge 118. Heat seal edge 118 is made up of various layers 118A of film-like material (such as polyethylene terepthalate (PET) or polypropylene) sandwiched with reinforcing film (such as nylon) 118B, adhesive or glue layer 118C, aluminum foil layer 118D and the actual inner heat sealing layer 118E the latter of which is preferably polypropylene. In another embodiment (not shown) the two film layers 118A, 118B made be made from a single continuous material, such as PET, nylon, polypropylene or the like. In the version shown, the various layers 118A through 118E form a pair of mirror-image stacks about the centerline formed at seam 117 of pouch 101. The stacked dimension is such that the exposed surfaces of the layers 118A through 118E are orthogonal to the cell 100 stacking axis A-A.

Figure 5:
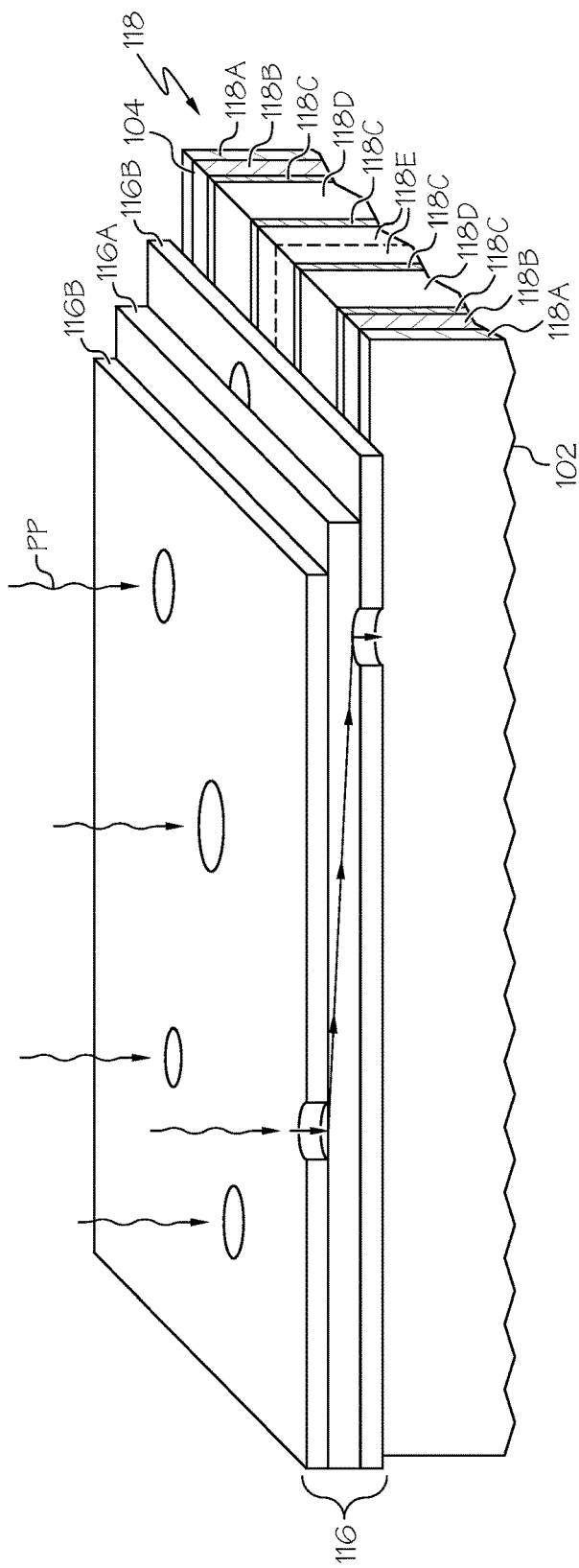
FIG. 5 shows another view of the placement of the barrier layer coating, this time depicting a multilayer configuration.

Referring next to FIG. 5 in conjunction with FIGS. 2 through 4, barrier layer coating 116 is placed over the permeable heat seal edge 118. It is presently shown in FIG. 4 as a single layer or sheet, and with three sheets (including a single layer of decoupling sheet 116A surrounded in a sandwich-like structure with a pair of barrier sheets 116B) in FIG. 5, it will be appreciated by those skilled in the art these and other variants are within the scope of the present invention. For example, a multilayer stack that includes more than one of the barrier layer coatings 116 may be formed. Likewise, a single barrier sheet 116B without a decoupling sheet 116A may also be formed; the choice of either is dictated by various design concerns, including cost, ease of application, degree of permeation resistance required, or the like. In configurations that employ both kinds of sheets placed in alternating stacked relationship, the barrier sheets 116B are made of an inorganic material (preferably an oxide, such as $Al_2O_3$, $SiO_2$, $TiO_2$ or zinc tin oxide (ZTO)), while decoupling sheets 116A are made of a material that is shown to exhibit good planarization properties as a way to blunt potential crack-initiation sites that may be present in the adjoining barrier sheets 116B. Examples of such materials include carbon, fluorinated carbons or silicates. In this way, the barrier sheet (or sheets) 116B provides the necessary high permeation resistance, while the decoupling sheet (or sheets) 116A helps enhance structural stability of the overall barrier layer coating 116, as well as provides a more tortuous gas or vapor permeation path PP. One exemplary deposition technique for the barrier sheet 116B may include sputtering, while an exemplary deposition technique for the decoupling sheet 116A may include wet coating and/or by CVD or PECVD. Furthermore, depending on the choice of oxides (such as those mentioned above), the water vapor transport rate (WVTR) can be made very low (for example, between about 1 gram per meter$^2$ per day and 0.01 gram per meter$^2$ per day for barrier sheet 116B thicknesses of between about 10 nanometers and 400 nanometers).

In a preferred form, the decoupling sheet 116A is surrounded on both sides by the barrier sheets 116B in order to reduce exposure of the relatively permeable decoupling sheet 116A to the ambient environment. Moreover, because at least some of the components used to create the heat seal edge 118 are gas and water vapor permeable (such as the polypropylene-based heat sealing layer 118E) and therefore susceptible to the edgewise diffusion of air, water vapor or internally generated solvent gasses within the active region 112 as a byproduct of the electrochemical process, the orthogonal placement of the barrier layer coating 116 over the joined edge formed by the heat seal edge 118 and pouch surfaces 102, 104 acts to thwart such diffusion. Even though WVTR cannot be described by traditional diffusion protocols, the proper choice of materials may be used to minimize its permeability (for example, centimeters$^3$ of $O_2$ per meter per day per atmosphere) and permeation (centimeters$^3$ of $O_2$ per meter$^2$ per day per atmosphere) properties.

Significantly, the barrier layer coating 116 could simplify heat sealing of the battery cell's pouch 101 by decreasing the width of the heat seal perimeter 114 of FIG. 3 and instead using the barrier layer coating 116 on the heat seal edge 118 to make up for the lost heat seal perimeter 114 width, thereby achieving the same level, or better, of water and electrolyte vapor permeation resistance. This would result in improving the energy density (measured, for example, in W*h/liter) of the battery cell 100.

As shown with particularity in FIG. 2, the barrier layer coating 116 resembles a picture frame-like structure around the pouch 101 periphery. As such, it is preferably oriented such that the surface with the larger dimension (i.e., the major surface) is placed orthogonal to the layer stacking direction of the heat seal edge 118 surface. Thus, if juxtaposed onto the heat seal edge 118 in FIG. 4, the major surface of the barrier layer coating 116 would face edgewise inward; this would have the effect of extending over the entirety of the thickness T (which in one exemplary form would be between about 160 micrometers and 220 micrometers) of the heat seal edge 118. In a more preferred form, the barrier layer coating 116 would extend slightly beyond the opposing ends of the heat seal edge 118; this overlapping cover acts to further reduce any edge-based diffusion. In either event, the barrier layer coating 116 ensures that water vapor, electrolyte gases or other fluids that would otherwise diffuse edgewise through the heat seal edge 118 additionally encounter a very low-permeability protective structure.

Figure 6A:
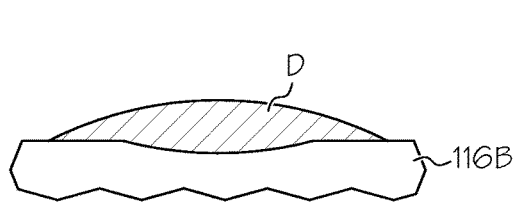
FIGS. 6A through 6D show varying degrees of hydrophilic and hydrophobic behavior of a surface enhancement coating the latter of which is preferably used in conjunction with the barrier layer coatings of FIGS. 4 and 5.
Figure 6B:
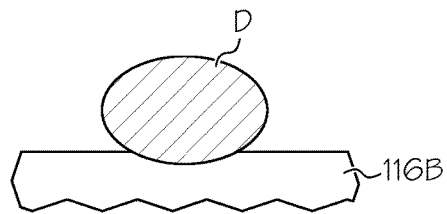
Figure 6C:
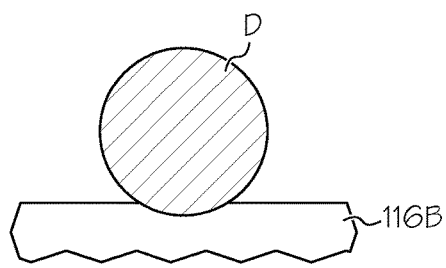
Figure 6D:
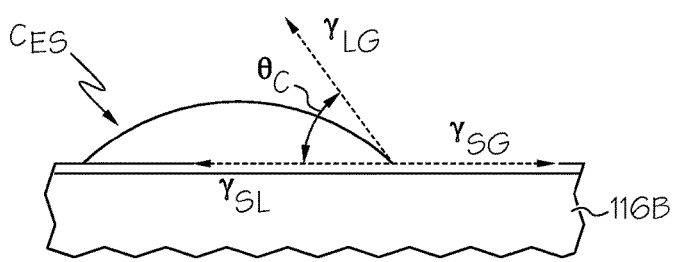

Referring next to FIGS. 6A through 6D in conjunction with FIG. 5, the influence of hydrophilic and hydrophobic properties imparted to the outermost surface (such as barrier sheet 116B) of the barrier layer coating 116 show the ability of a liquid droplet D to wet the surface, where the first (FIG. 6A) shows a high degree of wettability and the next two (FIGS. 6B and 6C) showing successively decreasing values. In the present context, the lower degrees of wettability as evidenced by the droplet in FIG. 6C are generally consistent with hydrophobic materials. As stated above, at least a portion of the benefit of the barrier layer coating 116 arises out of its having at least one low permeability barrier sheet 116B. In a preferred form, the barrier layer coating 116 further includes surface enhancement coatings or treatments (also referred to herein as surface enhancement materials) $C_{SE}$ that can be placed on or between adjacent sheets or layers to make the overall barrier layer coating 116 more hydrophobic such as depicted in FIG. 6C, which increases the likelihood that water (or other liquid that collects on the surface) will bead up and run off rather than wet it. This in turn eliminates water and electrolyte vapor and oxygen diffusion. Referring with particularity to FIG. 6D, in the present context, a surface is considered "hydrophobic" when a contact angle $\theta_C$ (as measured by Young's Formula or an equivalent approach) is between 90 degrees and 180 degrees. A more particular subset of hydrophobic materials is that where the contact angle is over 150 degrees; these are referred to as "superhydrophobic" materials. The present inventors have determined that wetting angles in the range of more than 110 degrees are preferable, and that a more preferred range are those with wetting angles of more than 130 degrees, and most preferably more than 150 degrees.

Such surface enhancement coatings $C_{SE}$ may include an additional topcoat made either by a coating like polytetrafluoroethylene (PTFE, such as Teflon® or the like), fluorinated carbon, zeolite, metal oxide, bismuth, parylene and siloxane, or by a fatty acid surface treatment layer. One form of the coating fluorinated carbon includes modifying amorphous carbon such that a fluorine-based doping material makes amorphous carbon film highly hydrophobic; such a material (which forms a multilayer carbon coating stack) combines the low friction properties of PTFE with the water resistance of tetrahedral carbon coating (ta-C). In one preferred form, one or more of these surface enhancement coatings $C_{SE}$ can be used as a layer over the barrier sheet 116B, or as part of an interlayer between the barrier sheet 116B and the decoupling sheet 116A to make a sandwich-like structure. Furthermore, such a surface enhancement coating $C_{SE}$ may be functionalized; in so doing, fluorinated moieties are added to the surface to render it more hydrophobic, while still preserving good durability.

It is preferred that the application of the various coatings, including the barrier layer coating 116, either with or without an additional hydrophobic layer (such as the surface enhancement coatings $C_{SE}$ placed on top), be performed through simple, low-cost processes, including dipping, spraying or atmospheric pressure coating. In another preferred approach, these materials are deposited by physical vapor deposition (PVD). In another preferred approach, a plasma-enhanced chemical vapor deposition (PECVD) method may be used; such an approach is particularly well-suited to siloxane-like materials and silica-like materials. The present inventors have determined that siloxane-like films are particularly suitable in that they are very hydrophobic and contain methyl groups and polymethyl siloxane that are helpful in (a) reducing surface energy, (b) forming the barrier coating 116 and (c) acting as a primer for adhesives. Likewise, plasma polymerized fluorocarbon films exhibit hydrophobic behavior, and additionally possess low coefficients of fiction, crosslinking structure and chemical inertness. These properties are helpful in reducing wettability and friction of an applied barrier layer coating 116. In one form, these materials have demonstrated contact angles of between 117 and 137 degrees. In another approach, Atmospheric Plasma Polymerization may be used. While traditionally employed to pre-clean and activate coatings on metals and plastics for industrial tools, the present inventors have determined that such an approach may be used for depositing multifunctional coatings which traditionally are prepared either sol-gel or PECVD process. As such, silica or titania films are grown by plasma jet which in turn can be tailored to have hydrophilic or hydrophobic functionalities as desired. For example, a substrate may be coated with silica/titania precursors that are subsequently condensed by a plasma jet. Post treatment may be used when the coating is required to be hydrophilic, while no such post treatment is required where the coatings are required to be hydrophobic. In still another form, ion beam modifications or related electrodeposition may be used. In the case of ion beam, atoms are sputtered from the surface of the substrate by directing high-energy ions against the surface. Surface pits are created which are nano-scale and micron-scale length, which imparts to the material a dual-scale roughness (also referred to as a roughness-upon-a-roughness in a manner similar to the lotus leaf effect discussed below). This roughens and creates a high surface area on the surface, thereby increasing hydrophobic properties. This may be carried out using a conventional plasma or an ion bombardment process, where an energetic ion beam (for example, between about a few tens to several hundred kilo electron volts (KeV)) impinges on the surface, where each ion in the beam is capable of dislodging several atoms upon striking the surface.

In still another approach, electrodeposition of zinc oxide (ZnO) nanowires could be used with a coating of long chain fatty acids such as stearic acid or palmitic acid to achieve the superhydrophobic properties, where contact angles as high as 176° are possible, making it extremely water-repellent. Such nanowire structures measure 2-5 μm in length and 100-200 nm in diameter, and cause the resulting wire-like ZnO structures to terminate in a nano-scale roughened tip.

Formed by electrodeposition, the as-deposited film is dipped in an ethanol solution of stearic acid or palmitic acid for 24 hours to activate the superhydrophobic behavior. The present inventors have observed multi-scale roughness on the top of the wires, while the hydrophobicity of the adsorbed stearic acid can be compared to the multi-scale roughness of the lotus leaf and its accompanying low surface energy waxy coating.

The surface that corresponds to the outermost layer of the barrier layer coating 116 may also be treated to enhance its surface texture, as more textured surfaces tend to exhibit "lotus leaf" effects and additional hydrophobic behavior. Equally important for the ability of the coating 116 to form a highly hydrophobic surface as a way to reduce the vapor permeation and diffusion-related phenomena discussed herein is its durability; this is particularly important in automotive battery environments where long-term use under widely-varying temperature and humidity regimes may otherwise detract from barrier layer coating 116 longentivity. To that end, some of these other desirable properties for the barrier layer coating 116 may include chemical resistance to organic and inorganic substances (acids, alkalines, gases, water vapor), high electrical insulation (including high dielectric strength), biocompatibility, and biostable, pinhole-free layer formation, uniform layer thickness, no outgassing, high wear resistance (at least 92 A shore hardness), temperature stability up to 100° C., or the like.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a prismatic battery cell, the method comprising:
    arranging a battery cell to comprise:
        at least one anode region, at least one cathode region, and an electrolyte region configured to facilitate ion flow between the at least one anode and the at least one cathode regions;
        a containment made with a metallic material and formed around the at least one anode region, the at least one cathode region, and the electrolyte region, the containment comprising a pair of facing substantially planar surfaces cooperatively joined to one another with a heat seal along a substantially common peripheral area to thereby form joined surfaces, each of the substantially planar surfaces including a polymeric coating, and the heat seal being disposed between the substantially planar surfaces and including a multilayer stack with distinct first and second polymeric layers attached together and adhered to one side of a metallic layer, the first and second polymeric layers including a first polymeric film layer attached directly to a first reinforcing film layer, and the metallic layer including an aluminum layer attached to the reinforcing film layer via an adhesive layer; and
        a plurality of electrically-conductive tabs extending outward from the containment, each of the tabs electrically cooperative with a respective one of the anode and cathode regions; and
    depositing at least one barrier layer coating to cover only an edge of the heat seal that is exposed from the pair of facing substantially planar surfaces, the at least one barrier layer coating including a multilayer sheet stack extending around at least a portion of a periphery of the containment.

2. The method of claim 1, wherein placement of the at least one barrier layer coating on the heat seal provides a greater degree of electrical isolation between the joined surfaces than the heat seal alone.

3. The method of claim 1, wherein the depositing is selected from a group consisting of dipping, spraying, and atmospheric plasma polymerization.

4. The method of claim 1, further comprising forming a layer of hydrophobic surface enhancement material onto the at least one barrier layer coating.

5. The method of claim 1, wherein the multilayer sheet stack of the at least one barrier layer coating comprises a carbon-based decoupling sheet sandwiched between a pair of inorganic barrier sheets.

6. The method of claim 1, wherein the at least one barrier layer coating comprises at least one barrier sheet and at least one decoupling sheet placed in facingly-adjacent contact with one another.

7. The method of claim 6, wherein the at least one barrier layer coating comprises a plurality of alternating barrier sheets and decoupling sheets.

8. The method of claim 7, wherein the barrier sheet comprises an inorganic material and the decoupling sheet comprises a carbon-based material.

9. The method of claim 1, wherein the multilayer stack further includes a second polymeric film layer attached to a second reinforcing film layer, and a second aluminum layer attached to the second reinforcing film layer via a second adhesive layer.

10. The method of claim 9, wherein the multilayer stack further includes an inner heat sealing layer sandwiched between and adhered to the first and second aluminum layers.

11. The method of claim 10, wherein the inner heat sealing layer includes polypropylene.

12. The method of claim 9, wherein the first and second polymeric film layers each includes polyethylene terephthalate (PET) and/or polypropylene.

13. The method of claim 9, wherein the first and second reinforcing film layers each includes nylon.

14. The method of claim 4, wherein the layer of hydrophobic surface enhancement material defines a contact angle of at least 150 degrees.

15. The method of claim 4, wherein the layer of hydrophobic surface enhancement material includes a topcoat comprising polytetrafluoroethylene, fluorinated carbon, zeolite, metal oxide, bismuth, parylene, and/or siloxane.

16. The method of claim 1, wherein the at least one barrier layer coating further includes a hydrophobic surface texture and/or a hydrophobic surface treatment.

17. The method of claim 1, further comprising applying surface treatment on the at least one barrier layer coating using zinc oxide nanowires with stearic acid or palmitic acid.

18. A method of making a prismatic battery cell, the method comprising:
arranging a battery cell to comprise:
an anode region, a cathode region, and an electrolyte region configured to facilitate ion flow between the anode and cathode regions;
a containment made with a metallic material and formed around the anode region, the cathode region, and the electrolyte region, the containment including a pair of facing surfaces joined to each other along a common peripheral area with a heat seal, each of the facing surfaces including a polymeric coating, the heat seal being disposed between the facing surfaces and including a multilayer stack with first and second polymeric layers attached together and adhered to one side of a metallic layer, the first and second polymeric layers including a polymeric film layer attached directly to a reinforcing film layer, and the metallic layer including an aluminum layer attached to the reinforcing film layer via an adhesive layer; and
a plurality of electrically-conductive tabs extending outward from the containment, each of the electrically-conductive tabs electrically connecting with a respective one of the anode and cathode regions; and
depositing a barrier layer coating over the heat seal, the barrier layer coating including a multilayer sheet stack extending along at least a portion of an edge defined by the joined facing surfaces.

19. A method of making a prismatic battery cell, the method comprising:
arranging a battery cell to comprise:
an anode region, a cathode region, and an electrolyte region configured to facilitate ion flow between the anode and cathode regions;
a containment made with a metallic material and formed around the anode region, the cathode region, and the electrolyte region, the containment including a pair of facing surfaces joined to each other along a common peripheral area with a heat seal, the heat seal being disposed between the facing surfaces and including a multilayer stack with first and second polymeric layers attached together and adhered to one side of a metallic layer; and
a plurality of electrically-conductive tabs extending outward from the containment, each of the electrically-conductive tabs electrically connecting with a respective one of the anode and cathode regions;
depositing a barrier layer coating over the heat seal, the barrier layer coating including a multilayer sheet stack extending along at least a portion of an edge defined by the joined facing surfaces; and
applying a surface treatment on the barrier layer coating using zinc oxide nanowires with stearic acid or palmitic acid.

20. The method of claim 19, wherein the multilayer sheet stack of the barrier layer coating includes a carbon-based decoupling sheet sandwiched between a pair of inorganic barrier sheets.

21. The method of claim 19, wherein the first and second polymeric layers of the heat seal include a polymeric film layer attached directly to a reinforcing film layer, and the metallic layer of the heat seal includes an aluminum layer attached to the reinforcing film layer via an adhesive layer.

* * * * *